United States Patent [19]

Sell et al.

[11] 4,393,638
[45] Jul. 19, 1983

[54] ANCHOR ROD, METHOD OF SETTING IT IN PLACE AND METHOD OF ITS MANUFACTURE

[75] Inventors: Rudolf Sell, Munich; Herbert Kistner, Freiburg, both of Fed. Rep. of Germany

[73] Assignee: Upat GmbH & Co., Fed. Rep. of Germany

[21] Appl. No.: 197,271

[22] Filed: Oct. 15, 1980

[30] Foreign Application Priority Data

Oct. 16, 1979 [DE] Fed. Rep. of Germany ....... 2941769

[51] Int. Cl.³ .............................................. E04B 1/38
[52] U.S. Cl. ...................................... 52/704; 52/736; 52/744; 405/261; 411/388
[58] Field of Search ...................... 52/704, 173 R, 127, 52/744, 736; 411/386–389, 412, 413; 405/259, 261

[56] References Cited

U.S. PATENT DOCUMENTS

| | | | |
|---|---|---|---|
| 2,227,713 | 1/1941 | Higgins | 52/704 X |
| 3,455,198 | 7/1969 | Barrett | 411/388 |
| 3,876,319 | 4/1975 | Meyer | 411/387 |
| 3,893,274 | 7/1975 | Salisbury | 411/388 X |
| 3,940,941 | 3/1976 | Libert et al. | 411/386 X |
| 4,147,088 | 4/1979 | Whittaker | 411/387 |
| 4,313,697 | 2/1982 | Rozanc | 405/261 |
| 4,325,657 | 4/1982 | Elders | 405/259 |

FOREIGN PATENT DOCUMENTS

| | | | |
|---|---|---|---|
| 731381 | 4/1966 | Canada | 411/388 |
| 410855 | 5/1934 | United Kingdom | 52/704 |

*Primary Examiner*—J. Karl Bell
*Attorney, Agent, or Firm*—Frishauf, Holtz, Goodman & Woodward

[57] ABSTRACT

An anchor rod for insertion in a fastening matrix such as a concrete structural element, by means of a hand-held percussion drill, has a smooth mid-section of slightly reduced diameter just below a slightly thickened intermediate collar that separates it from threading at the external end of the rod and has a profiled ridge and groove section at its insertion end which has a lefthand twist for insertion with a righthand rotation, as well as a frustoconical flat tip. The profiled section increases in diameter gradually towards the tip. At least the profiled section is manufactured by cold deformation with flat ridge tops having minutely burred or beaded edges. The method of setting involves the use of a mortar, preferably a synthetic resin two-component mortar, and there are added, either separately or in one of the mortar components, abrasive particles such as quartz sand grains, of a grain size suited to the size of the grooves in the profiled portion of the rod, so that during insertion of the rod in a pre-bore drilled with a drill of a diameter corresponding to the maximum diameter of the anchor rods, an undercutting type of abrasive effect will widen the bore progressively towards the end thereof, this being assisted by an inherent eccentric movement of the rod as it is rotated and chews into the mortar, breaking up in most cases the fragile capsules in which the components are provided to provide further abrasion. The smooth shaft portion between the intermediate collar and the profiled insertion end of the rod may be provided with a release coating to reduce or prevent bonding with the mortar in order to allow stretching this portion of the rod under stress and providing the effect of an expansion bolt, if such an effect is desired. The bonding effect in any case is at a maximum at the inner end of the bore.

23 Claims, 15 Drawing Figures

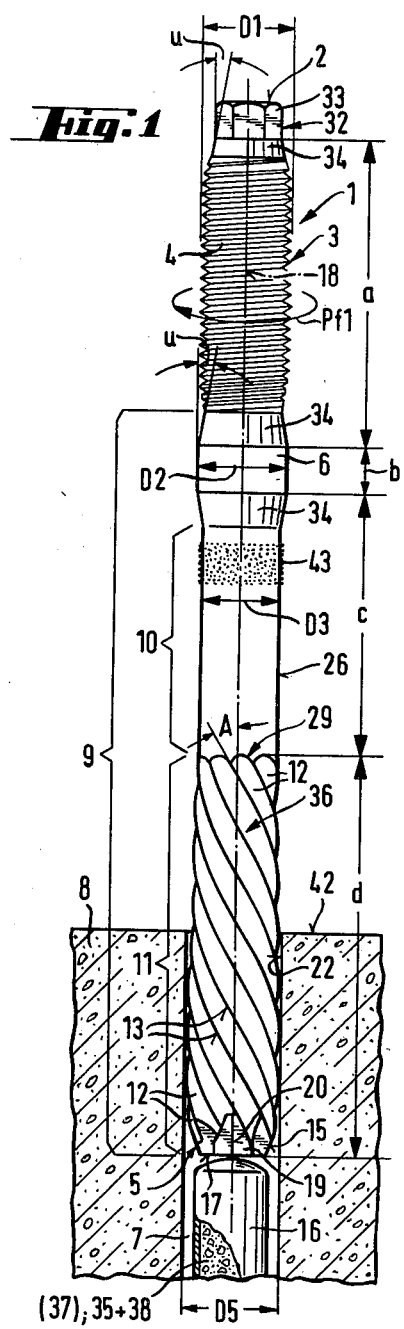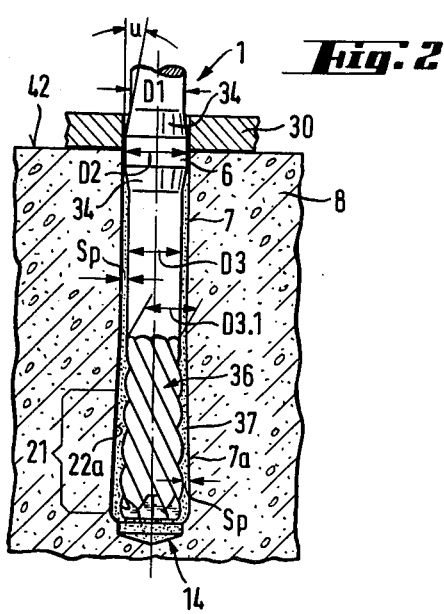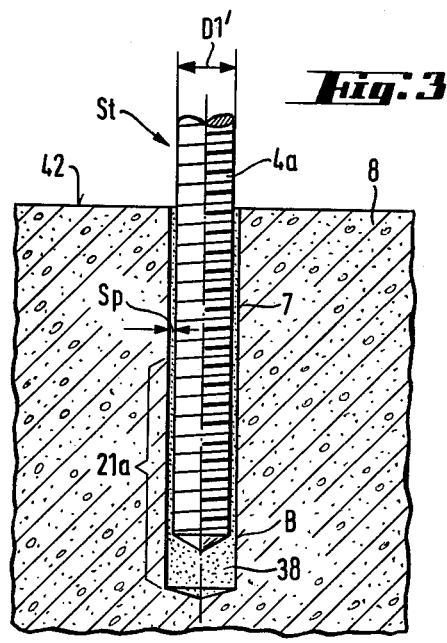

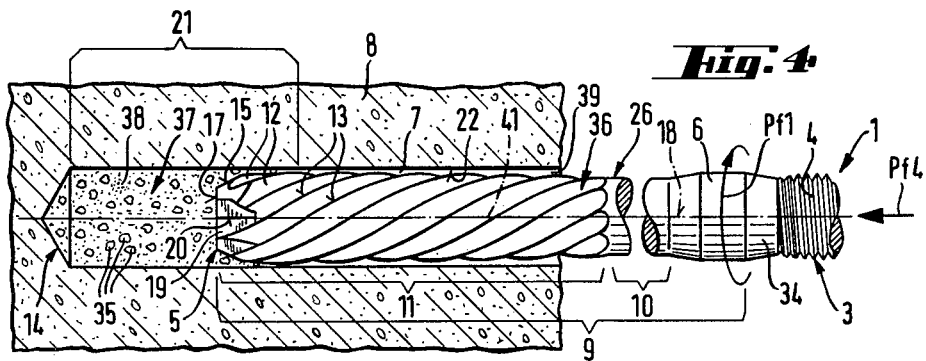
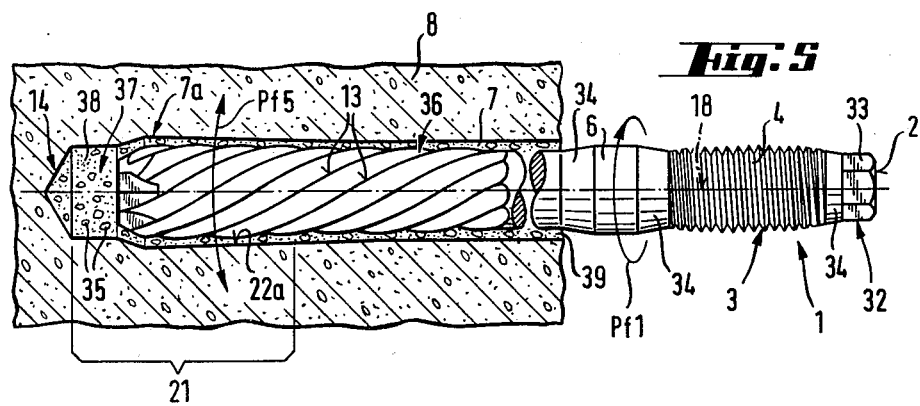
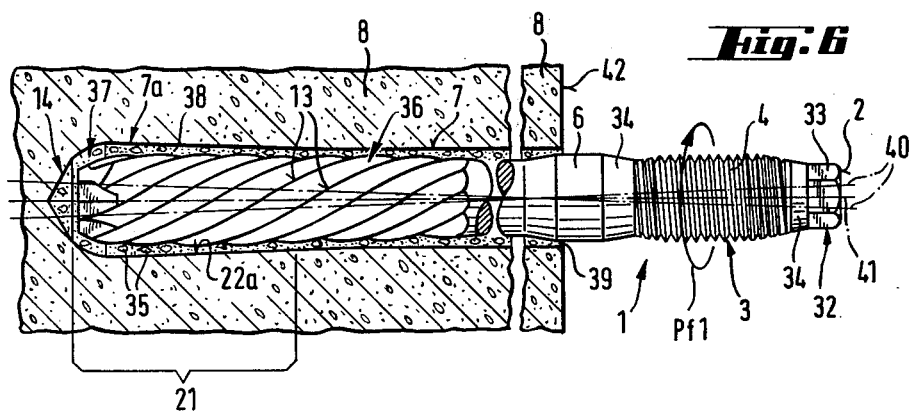

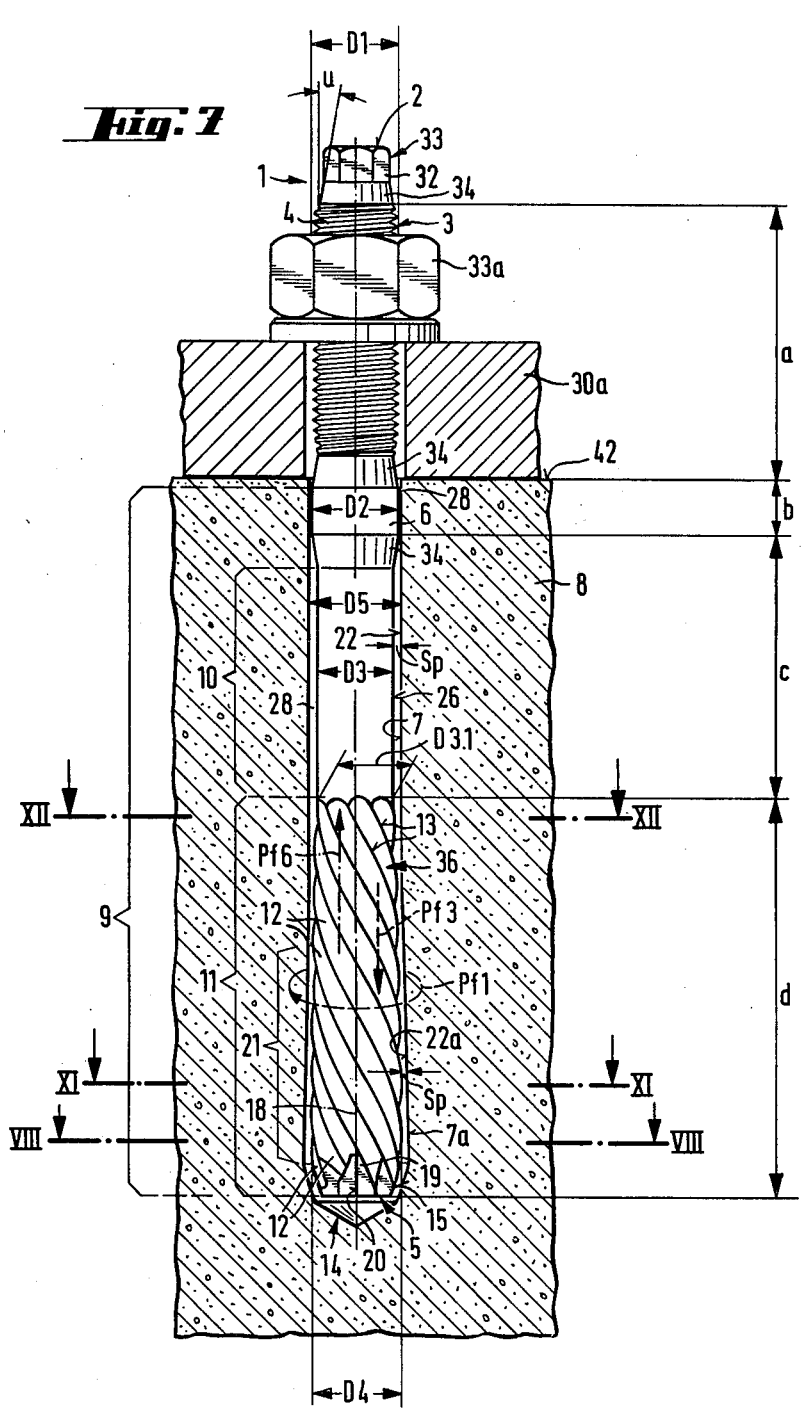

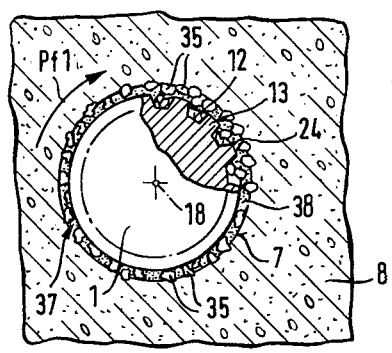
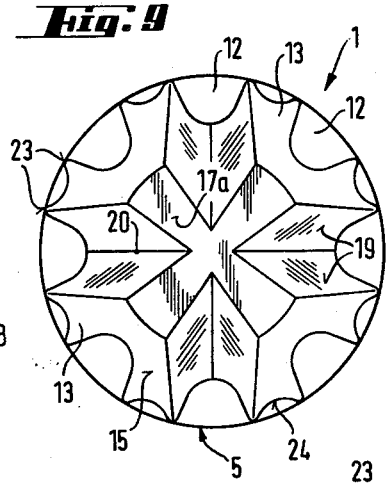
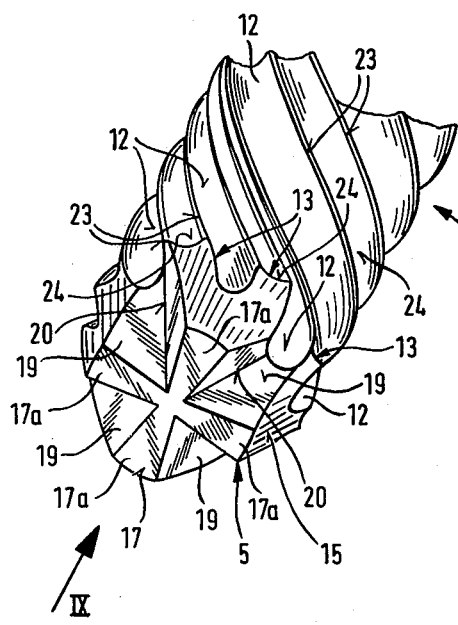
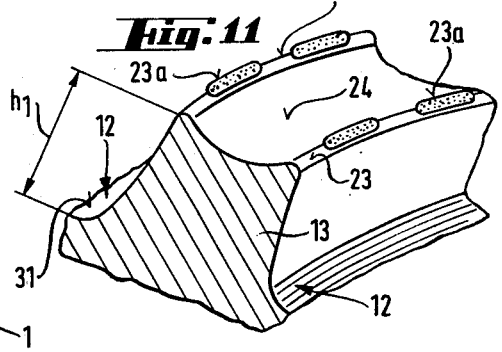
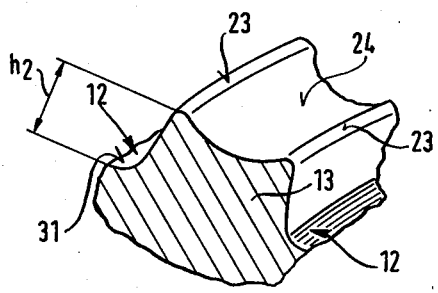

ANCHOR ROD, METHOD OF SETTING IT IN PLACE AND METHOD OF ITS MANUFACTURE

The invention concerns the setting of anchor rods in concrete or in other structural matrices and involves the method of setting the rod, the characteristics of the post and the method of its manufacture. The setting method is one that involves providing a substantially cylindrical preliminary bore in the concrete or other fastening matrix, which may be referred to as a pre-bore, into which mortar, preferably synthetic resin mortar, as well as the insertion portion of the anchor rod are inserted while the anchor rod is rotated, producing partial squeezing and stirring of the mortar, that may contain granular additions such as quartz grain for improving shear strength or the like, the anchor rod becoming bonded to the fastening matrix, such as concrete, by hardening of the mortar.

Setting methods for anchor rods are known in which the anchor rod is introduced into a pre-bore along with a mortar that may contain hard granules, while the anchor rod is rotated and stirs and partly squeezes the mortar. In many respects, anchor rods having a continuous threading over their entire length have been found advantageous for such setting methods. The screw threading at the outer end of the anchor rods serves the function of a fastening means, whereas in the insertion portion of the rod it serves the function of favoring the uniform distribution of the synthetic resin mortar over the length of the pre-bore. The synthetic resin mortar is usually put into the bore in the fastening matrix by using two component packets. The packet is broken up and practically shredded by the introduction of the anchor rod, causing a hardener component and a binder component and sometimes also additives to be mixed together, so that the mixed synthetic resin mortar can then begin to harden. As a rule, the bore has an inner diameter that is two to ten millimeters greater than the outer diameter of the anchor rod itself. Accordingly, the mortar, after hardening, fills a ring gap of a wall thickness of up to 5 millimeters between anchor rod and bore hole wall.

The known anchor rods, as a rule, have a screw thread over the entire length, but in the region to be mortared, they may sometimes have a screw-thread-like shaping, instead of a continuation of the actual threading. The screw-thread-like shaping of the lower portion of the anchor rod desirably provides a kind of toothing of the periphery between the mortar and the core of the insertion portion of the anchor rod (compare for example DE-PS No. 22 22 013).

The above-described anchor rods and method of setting them, in addition to many advantages, also have disadvantages that make them markedly unsuitable in certain fields of application. For example, it is desired on the one hand to have as uniform as possible a distribution and as effective as possible a bonding characteristic for the mortar over the entire insertion range of the anchor rod in order to provide the necessary security of bonding. Anchor rods provided with screw threads along the whole length have, for example, the disadvantage that they come to lie against the edge of the seating hole in their functional position, as the result of which they are substantially impaired in their load-carrying ability, particularly with respect to bending and shear.

Furthermore, as a general rule, the known anchor rods, when fixed in their foundation with synthetic resin mortar or the like, are not usable after the manner of an expansion bolt.

A method for anchoring in rock, particularly in mountainous formations, with the help of adhesive anchors, in which the wall of the pre-bore is from place to place widened beyond the normal cross-section, is disclosed in DE PS No. 25 38 003. For this method, however, a supplementary cutting tool is needed in making the bore and, correspondingly, also an additional boring operation. Furthermore, in that case a helical groove is cut at least over a large part of the bore region for insertion of the anchor and accordingly a high quality of the fastening as deep as possible in the anchor ground is not very well favored. In order to overcome these disadvantages, an anchoring element has been devised that itself can serve as a widening tool for the bore, as disclosed in DE GM No. 69 09 859. That is concerned, however, not with an inherently rigid and essentially nondeformable anchor rod, as in the present invention, but much rather with an anchoring element having at its end an insertable radially extendable setting device provided with teeth that are brought into the extended operating position by means of a pulling device. This anchoring element and its setting method are expensive, both with respect to the manufacture of the device and its application. There is also the disadvantage that in the course of time the pull from tension devices, and thereby the applied pressure in the bore, can relax, as the result of which the force transfer can vary in an uncontrolled manner. Furthermore, the cross-sectional areas that can be loaded in the pulling direction of the anchoring element are noticeably smaller in comparison with the diameter of the pre-bore.

THE INVENTION

It is an object of the invention to provide a method of setting anchor rods in which a substantial increase of the forces that can be withstood and transferred is possible, without bringing on the disadvantages of the known methods, while keeping the cost of performing the setting at an economical level. It is a further object to provide an anchor rod for use in such a method that can be produced without any great additional cost, and one that can also be used after the fashion of an expansion bolt, and to provide a method of making such an anchor rod. In particular, it is an object of the present invention to provide an anchor rod which, during its setting, the pre-bore which is at first substantially cylindrical can be widened at its inner or bottom end somewhat conically, with the further object that such an anchor rod should be stable and capable of withstanding heavy loads and should be simple to manufacture and relatively easy and simple to be placed into the pre-bore.

Although as already mentioned two component synthetic resin-forming packets in which at least one component has a filler such as quartz particles are known, these hard granular additives, in such cases, had the purpose of improving the shear or pressure resistance of synthetic resin mortar and were not provided to produce any appreciable or advantageous abrasion on the wall of the pre-bore. In consequence, in the case of the known practices regarding anchor rods having screw threadings on the insertion portion corresponding to the rotary insertion direction of the rod, these particles essentially remained in the thread grooves. In practice, it has been found that under circumstances it can occur that a slight widening of the pre-bore can result in that conventional practice, but such a result was and is not intended and takes place in an uncontrolled manner over the entire axial length of the pre-bore.

In comparison with the prior practices above described with reference to DE PS No. 25 38 003 and DE GM No. 69 09 859 for anchoring rods in mountain rock, the method of the present invention has great advantages. Thus, there is no need for a second boring operation to widen parts of the pre-bore before insertion of the anchor rod, nor is there any need for actuating an extendable jointed portion of the anchoring device during its insertion under rotary movement, and yet with the process of the invention a conical widening towards the inner or deeper ends of the pre-bore is produced. As a result, by virtue of the hardened mortar, there results both a bonding and to some extent a keying of the anchor rod in the deeper portion of the pre-bore.

The feature of providing the diameter increase of the pre-bore essentially in its inner or deep end region has the advantage that the anchor rod is bonded particularly fast with the surrounding masonry base in the region of its inner or deep end.

It is particularly useful in the method of the invention to deviate the insertion portion of the anchor rod, so that its deeper portion is somewhat eccentric with respect to the rotation axis for the rotation applied during insertion. This favors the undercutting type of abrasion in the pre-bore and takes place particularly effectively in the inner or deep end region of the pre-bore if the corresponding portion of the insertion part of the anchor rod carries out an eccentric movement in a forceful fashion. This results practically inherently if the anchor rod is inserted with a hand-directed boring machine and has no centering point or other centering aid at its deep extremity. The desired eccentric movement can be further favored if a shaft section of the insertion part of the anchor rod near the external end of the post has a somewhat reduced diameter, as will be further described below.

An already known two-component adhesive or resin packet in which quartz grains or the like are already provided as an additive for other purposes can be used in the method of the present invention. Experiments have shown that with performance of the method according to the invention the desired abrasion of the undercutting type results in the pre-bore. Of course, abrasive grains or other hard additives serving as abrasive elements, for example of strand or fiber shape, can be provided in the mortar mixture when it is still pasty and in unhardened condition. Under certain circumstances, the abrasive grains or other abrasive elements can also be put into the pre-bore independently of the mortar. It is particularly advantageous, however, to insert these abrasive grains or the like together with the mortar.

The respective volumes of the insertion portion of the anchor rod, the mortar packet and the hollow space of the pre-bore can be adjusted to each other to advantage. Even when the volume of the removal of material from the wall of the pre-bore cannot be estimated more accurately in advance, there is a constant fill volume with reference to the unobstructed space of the widened pre-bore. Appreciable volume tolerances regarding the effective abrasion do not appear with respect to the preselected volume ratios. This also brings about that the bore opening is at least somewhat closed to the outside towards the end of the setting. This can result in an adequate way, for example, by means of an intermediate collar of the anchor rod yet to be described. A still remaining smaller gap at the intermediate collar is desired in order that an excess of a mixture of mortar and the like can escape at the open end of the pre-bore. The latter is also to be desired because by such an escape of excess mixture, evidence is obtained that the space between the insertion portion of the anchor rod and the (widened) wall of the pre-bore is completely filled with mortar or mortar mixture.

A particularly advantageous form of the method of the invention consists in that at least a portion of the abrasive grains or the like are grasped or carried along for a distance by a profiled entrainment region of the anchor rod, so that these abrasive grains or the like are forced, at least intermittently, in stages over the ribs of the profiled section of the rod that has just been mentioned. Experiments have shown that with such profiling of at least a section of the insertion part of an anchor rod, the additives to the mortar wear down well the wall of the pre-bore if they are forced in between the radially projecting parts of the anchor rod on the one hand and the wall of the pre-bore on the other during the rotary driving end of the anchor rod. These solid additive materials then function very intensively for a while as abrasive elements and widen the pre-bore at corresponding locations. If desired, still other sufficiently hard additives to the mortar mass, such as broken pieces of glass capsule or even harder inclusions from worn-off wall material participate in this abrasion treatment. All these hard parts of the mortar mixture or of the materials later added or picked up can mix into the mortar mass during setting of the anchor and can penetrate into the position previously mentioned between the profiled portions of the insertion end of the anchor rod that stand out radially and the wall of the pre-bore. The described manner of operation of the abrasive grains or the like in removing materials from the wall of the pre-bore can be favored if the diameter of the abrasive grains is in the range from 0.3 to 6 mm and preferably from 1.5 to 1.8 mm and have such a relation to the profile height of the radially extending ribs of the anchor rod, that abrasive grains or the like are carried along in the grooves and some of them are moved to the tops of the ribs and particularly there carry out abrasion of the pre-bore.

Experiments have shown that no particularly good abrasion effect is obtained with grain sizes comparable more or less to the open cross-sections of the grooves or intervals between the radially projecting ridges of the anchor rod. On the other hand, very small abrasive grains actually have no good abrasive effect if they can move around in the remaining gap between anchor rod and pre-bore wall without having to score the wall of the pre-bore. In between, however, in accordance with the invention, good results are obtainable with grain sizes in the range above mentioned and with groove cross-sections sufficiently large so that the abrasive grains or the like, on the one hand, by themselves and independently, can move in these grooves for corresponding profiling during the setting operation for the anchor rod. Very many abrasive grains then manage to get out of these grooves, as experiments have shown, onto the outwardly facing surfaces of the ridges between the grooves that are moving circumferentially. There they are wedged or forced between these ridges and the wall of the pre-bore and perform further abrasion work on the wall of the pre-bore.

It is also desirable during a period of the insertion of the anchor rod to force the mixture of mortar and abrasive grains on the one hand in the direction of the opening of the pre-bore and on the other hand, circumferentially, as well as occasionally in the direction to the deep end of the pre-bore, and to provide practially no axial feeding of the mortar mixture by the rotary movement of the anchor rod during setting in the neighborhood of the open end of the pre-bore. In this manner, it is obtained that the mixture of mortar and abrasive grains or other abrasive elements during the pressing-in of the anchor rod in its pre-bore are not propelled at once in the direction of the open end of the pre-bore or expelled therefrom with the disadvantage of leaving fewer abrasive grains or the like available in the deep end. Instead, a relatively large amount of abrasive grains (together with the mortar mixture) are caused to remain longer in the deep end of the pre-bore. Thus, there remain a larger number of abrasive grains or the like in this region for clearing away the wall of the pre-bore from time to time. On the other hand, by this process, there is no hindrance to filling, by the end of the setting at both ends, the entire gap between insertion portion of the anchor rod and the widened wall of the pre-bore with the mixture of mortar and abrasive grains. Furthermore, the disadvantage of known setting methods, that when as is frequently the case, the anchor rod has a righthand thread and is twisted into the pre-bore with the usually righthanded rotation tools available at construction sites, the righthanded threading of the anchor rod in the region of the insertion part of the post feeds the mortar mixture in the direction of the open end of the pre-bore after the manner of a conveyer screw. If the rotary movement of the anchor rod is not stopped in time, a part of the still unhardened mortar mixture is easily expelled from the pre-bore in an undesirable fashion. By the method of the present invention, however, by which along with the abrasive grains the mortar mixture is also moved towards the inner end of the hole, this disadvantage is avoided. This is advantageously favored by providing practically no axial feeding of the mortar in the neighborhood of the opening of the pre-bore during the setting of the anchor rod.

As already mentioned, the invention also provides a distinctive anchor rod having at its outer end a connection part and an insertion part having a profiling producing an entrainment section of the anchor rod for the abrasive elements of the mortar mixture, constituted by grooves or the like and extending ridges between them. The entrainment region for the abrasion elements of the mortar mixture, however, does not have to be in the form of continuous grooves but can, for example, be provided by pockets or niches between crisscrossing oblique ridges or lands.

When such an anchor post is introduced into a cylindrical pre-bore in the usual way, in which mortar, preferably synthetic resin mortar, as well as hard granular additives such as quartz grains are contained, many grains thereof are rolled along (together with the mortar) in the direction of rotation used for insertion of the anchor rod. Hard grains cooperate as abrasion elements with anchor rods so constituted. Experiments have shown that with rotary insertion of the anchor rod an appreciable percentage of granular additives penetrate outside the grooves or other concave profiling between the ridges onto these ridges between the grooves or pockets of the profiling of the entrainment section, on the one hand, and the wall of the pre-bore on the other hand. Here, the granular additives are forced along the wall of the pre-bore as abrasive elements and there increase the diameter of the pre-bore. Since the grooves, ridges, or other profiling of the entrainment section of the anchor rod are provided in the region of the insertion end of the rod and the rotary movement in the deep end region of the pre-bore is can be carried out long enough, a widening of the pre-bore performed particularly in the region of its deep end. There is thus obtained without supplementary tooling and without supplementary process steps a modification of the pre-bore towards a conical widening that is progressively greater towards the deep end. In addition, there is obtained in the usual way, e.g. by the use of two-component adhesive or resin packets, a desired breaking up of these packets, as well as a thorough intermixing and distribution of the synthetic resin mortar. The anchor rod provided with grooves, ridges, niches, or other similar features, provides particularly good possibility of bonding or the synthetic resin mortar, both in terms of surface area and of shape. At this end, the already mentioned conical widening of the bore provides particularly good fastening of the anchor rod in the inner or deep end of the bore, which is to say in the region of the inner or deep end of the anchor rod. In consequence, the withstanding or transmission of greater forces is favored, since the force that can be withstood and transferred by an anchor rod set in mortar, particularly synthetic resin mortar, depends among other things, substantially on the adhesion that has become established between the mortar mass and the base or concrete matrix on the one hand and between the mortar mass and the insertion part of the anchor rod on the other hand. Furthermore, the inwardly conically widened shape of the bore in connection with the hardened mortar and the profiling of the inward-extending insertion section (entrainment region) of the anchor rod along with the adhesion effects, also provides a kind of keying of its profiled entrainment region. If the already known adhesive or resin packets used which have granular additives with improved shear strength or the like, these additives, consisting for example of quartz grains, assume a double function: at first, they serve according to the process of the present invention as abrasive elements for widening the pre-bore in the manner already described; later, the same abrasive grains and if present also supplementary abrasive grains later added as additives for the mortar serve to improve the shear strength of the mortar.

Under particular conditions, the grooves or ridges of the profiled insertion section of the anchor rod can be arranged axially. According to the invention, however, the grooves and ridges have a steep-pitch spiral configuration and preferably have have a rising inclination opposing the direction of rotation during insertion, between about 15° to about 87°, preferably about 25°. The profiled entrainment section of the anchor rod is then constituted after the fashion of a multiple thread feed screw that feeds the mixture of mortar, abrasive grains or the like, and possibly other additions, down in the direction of the inner or deep end of the pre-bore during the rotary insertion of the anchor.

At least an appreciable portion of the abrasive grains are imparted a rotary motion and some of them are forced in between the ridges of this portion of the anchor rod the wall of the bore and at least intermittently participate in the rotary movement of the anchor rod during its insertion. By the above-mentioned down-feeding of abrasive particles, an undesired rapid exit of mortar and particularly of abrasive particles in the direction of the open end of the bore is prevented. In any event, the expulsion of material beyond the actual excess of mortar in the bore is prevented. The widening of the pre-bore in the region of its inner or deep end is thereby favored. Since at the construction site manually held drills, percussion drills, or similar tools also used for insertion of anchor rods, run with righthand rotation, or at least can be set for righthand rotation, the constitution of the anchor rod according to the invention with a lefthand thread is advantageous. In practice, it then results that the grooves and ridges of the profiled insertion section of the anchor rod oriented in opposition to the direction of rotation during insertion can provide the screw-feed effect already mentioned. The provision of the profiling over one-half to two-thirds of the entire length of the insertion part of the anchor rod, leaving the rest as a cylindrical shaft section, favors the undercutting type of widening of the pre-bore, particularly in the region of the end of the rod and provides that particularly there the bond between the anchor rod and its matrix is favored after the hardening of the mortar. Experiments have shown that a synthetic resin mortar does not have as good a bonding capability with a smooth shaft section as with a profiled one. This is particularly important because the pulling forces exerted on the anchor post are provided predominantly in the region of the deep end of the pre-bore.

The outer end of the anchor rod normally is provided with screw-threading or some other fastening profile. Preferably at its lower end, an intermediate and substantially cylindrical midportion is provided which is of a diameter corresponding approximately to the outer diameter of the screw-threading, thus providing a surface suitable for tight insertion through an object. This intermediate collar thus can, for example, be engaged by a structural component to be fastened by the anchor post. It can adequately take the forces that may result from transverse loads in certain cases, i.e. keeping such forces away from the threaded portion. The intermediate collar can also effectively take care of bending loads that may rise in this region, since the cross-section of the collar is substantially larger than that of the threading provided for attachment. The smooth shaft portion below and adjacent to the collar—the purpose of which is explained further below—has a smaller cross-section compared to that of the collar. This cross-section reduction does not lead to any reduction of the load capability of the anchor, since in this region only tension stresses arise; the reduced cross-section is nevertheless greater than the stress cross-section of the threaded portion provided above for fastening. Furthermore, any bending load operating here on the anchor rod is taken up by the mortar.

Between the insertion end that is in profiled form and the collar, the anchor rod according to the invention—as just mentioned—has a smooth cylindrical shaft section or transition region of reduced cross-section. The configuration of this cylindrical shaft section has been found advantageous when the profiled section of the insertion part of the anchor rod extends over half to two-thirds of the aggregate length of the insertion part, and the remainder of the insertion part, up to the intermediate collar above described, preferably has the configuration of a cylindrical shaft section with a completely smooth or at least essentially smooth peripheral surface. The surface roughness of the peripheral surface is preferably less than 20 microns. The conventional anchor rods used heretofore for setting with a bonding mortar are usually provided with a screw-threaded profile over their entire length, so that a sort of keying is produced between the threaded profile and the hardened mortar over the entire insertion portion of the anchor rod. If this anchor rod is stressed in tension, a length expansion takes place within the stretch limit of the anchor rod that is greatest in its absolute value at the upper edge of the bore hole and substantially exceeds the expansion capability of the mortar in this region, so that the mortar cracks particularly in this region.

In recognition of this characteristic of the construction that has been conventional up to now, it is proposed by the invention, as above explained, to provide an unprofiled smooth transition region between the profiled length portion of the insertion part of the anchor rod and the collar that corresponds to the bore diameter. A ratio of 0.8 to 1 has been found favorable for the relation of the smooth transition portion to the profiled length. By this smooth profileless transition region, a bond-free zone is produced by which the above-described disadvantages are avoided, since the anchor rod has only a slight bonding with the mortar mass in the region of its greatest elongation under stress. The bonding can be completely eliminated, for example, by coating this region with a release coating such as is commonly used to prevent adhesion. The bond-free zone furthermore makes possible the assumption that the anchor rod is designed after the fashion of an expansion bolt and can be set under pre-stress in order to be able to withstand transverse forces through friction between the bearing surfaces of the object to be fastened and the bearing surface of the structural component.

The reduced cross-section of the smooth shaft section with respect to the collar above it produces the same annular gap between the anchor rod and the bore wall, as in the case of conventional cylindrical anchor rods, with the advantage that the bore diameter can be kept smaller, which results in less drilling work and a smaller mortar ampoule. Thus the same holding forces as before can be handled, since on the one hand the bond between mortar and matrix can extend fully over the entire depth of the bore and on the other hand the force transfer between the anchor rod and the mortar proceeds by mechanical interfitting through the profiling in the lower region.

The intermediate collar both favors the taking up of transverse forces and stabilizes the anchor rod in a critical region. Furthermore, it provides for the anchor rod a certain supplementary guidance if this collar is brought correspondingly far into the bore of the matrix (compare FIG. 2). There can also provide for centering an object to be fastened, when it projects for a corresponding length out of the ground in which the rod is set (FIG. 4). In addition, the intermediate collar also provides a certain termination of the bore and prevents an undesired or an undesirably rapid exit of the mortar mixture.

Another feature that may be used in accordance with the invention is an at least approximately cylindrical external peripheral shape of the inner or deep end section of the entrainment portion of the anchor rod more or less fitting the peripheral shape of the widened bore, thus providing a convenient manufacturing possibility without undue machining. The smooth shaft section lying closer to the pre-bore opening also favors the conical widening towards the inner or deep end of the bore. This connection is helpful for the diameter of the end section of the profiled entrainment section of the anchor rod to be slightly smaller than or equal to the diameter of the intermediate collar, while the height of the ridges of this entrainment section increase, preferably continuously towards the inner or deep end of the rod.

Still other features that are of consequence are that the end face of the insertion portion of the anchor rod should be more or less transverse to the longitudinal axis of the rod and preferably flat, and also that at this deep end of the insertion portion of the rod there is a substantially frustoconical circumferential shape, preferably a few grooves or other depression extending into the frustoconical portion. Another useful feature is to provide one or preferably more triangular kerfs running radially at the end of the rod, the bottom of the kerfs having an inclination towards the direction of the longitudinal axis as well as towards the deep end of the rod. These may be radially symmetric in arrangement, preferably in cross-cutting fashion. These last-mentioned features, together with the use of an eccentric movement as already mentioned, favor the shattering of the glass ampoules or the like containing the synthetic resin mortar components, as well as the mixing of the mortar and its introduction into the groove regions of the profiled part of the rod.

Another feature that is useful to provide in the anchor rod of the invention is to provide a projecting connection element at the top of the rod made without cutting and provided with a suitable transition, such as a bevel, this connection part having for example a square or a hexagonal contour of which the envelope circle is of reduced diameter with respect to the rest of the rod.

In the manufacture of the anchor rod it is desirable for the profiled entrainment section to be produced essentially by cold deformation. The anchor bit or rod can be cold-formed from wire or rod with the outer threads and also the profiling of the entrainment section produced by rolling, and the intermediate collar produced by upsetting. The cold-forming of the profiling have the advantages that the edges of the ridges have somewhat radially projecting burrs which are formed without supplementary work. A most significant and virtually essential feature is that the radially external end surfaces of the ridges are then somewhat trough shaped. This prolongs the dwell of the abrasive grains in the region of these hard surfaces of the ridges, which favors the wearing away of the wall of the pre-bore. A certain irregularity produced by this technique of manufacture favors the burred edges and thus also the entry of the abrasive grains into the region of the outer faces of the ridges. The rolling method of producing the profiling has the advantage that the manufacture of the insertion end of the anchor rod can be made independent of the shape of its external end. Special requirements regarding the insertion part can easily be taken account of. Thus, in accordance with the invention, manufacture without machining is possible in a consistent and therefore economic series of operations.

BRIEF DESCRIPTION OF THE DRAWINGS

The invention is further described by way of illustrative example with reference to the annexed drawings, in which:

FIG. 1 is a side view of an anchor bit or rod according to the invention partly inserted in a pre-bore in a fastening matrix that is illustrated partly in section;

FIG. 2 is a partial representation, partly in section, of an anchor rod according to the invention set in its bore;

FIG. 3 is a representation similar to FIG. 2 showing a previously known anchor rod;

FIGS. 4, 5 and 6 respectively show three different stages of the setting of an anchor rod, with the widening of the pre-bore being shown somewhat enlarged in FIGS. 5 and 6 for reasons of clarity;

FIG. 7 is a side view, partly in section, of an anchor rod according to the invention, omitting the mortar, illustrating the use of the anchor rod to fasten an object to the matrix in which the anchor is lodged;

FIG. 8 is a partial section through the anchor rod and the fastening matrix along the section line VIII—VIII of FIG. 7;

FIG. 9 is an end view of the inner or deep end of the anchor;

FIG. 10 is a perspective view of the insertion end of the anchor rod on a greatly magnified scale;

FIG. 11 is a cross-section through a ridge of the profiled insertion section corresponding to the section line XI—XI of FIG. 7;

FIG. 12 is a section similar to FIG. 11 corresponding to the section line XII—XII of FIG. 7;

DETAILED DESCRIPTION OF THE INVENTION

Figure 13:
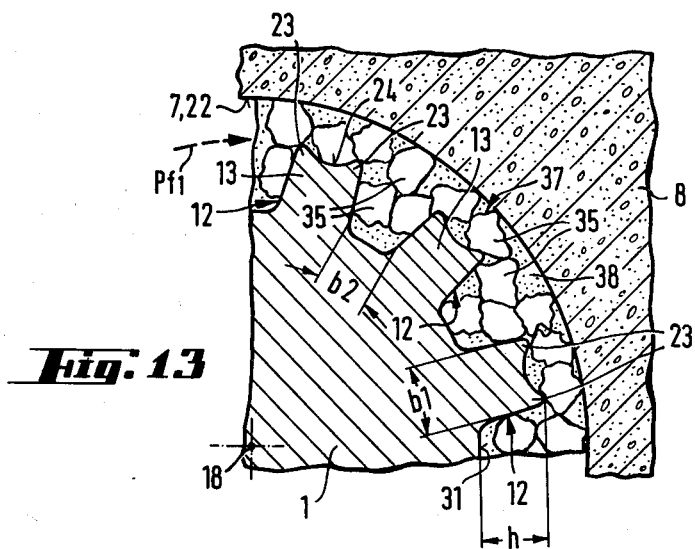
FIG. 13 is a partial cross-section through the anchor rod similar to FIG. 8.

An anchor rod 1 according to the invention is illustrated particularly in FIGS. 1, 7 and 9, in side view in FIGS. 1 and 7, and in end view in FIG. 9. In the region of its external end 2, it has a connection portion 3 which features outer screw-threading 4. Adjacent to the latter towards the inner end 5 of the anchor rod 1 is an intermediate bead or collar 6 that preferably has the shape of a short cylindrical section. This intermediate collar 6, in the inserted position of the anchor post 1, can, as may be required in the particular case, be either entirely (FIG. 7) or partly (FIG. 2) pushed into the pre-bore 7 of fastening matrix 8 for the anchor 1. In certain cases, however, it may extend substantially out of this pre-bore 7 (FIG. 6). The intermediate collar 6 or some part of it is accordingly to be regarded as part of the insertion portion 9 (compare FIG. 1).

The fastening matrix 8 can, as shown in the illustrative embodiments, be in some cases stone or other masonry. This insertion part 9, according to a preferred embodiment of the invention, has a smooth shaft section 10 that adjoins the intermediate collar 6 and extends towards the inner end 5 of the anchor. Farther along towards the inner end 5 of the anchor rod 1, the smooth shaft section 10 ends, and a profiled insertion part section 11 begins. The latter is profiled, in accordance with an important feature of the invention, with grooves 12 or similar recessed channels and projecting ridges 13 or similar projections contrasting with the grooves (compare particularly FIGS. 7 to 10, 13 and 14). The grooves and ridges can, as illustrated in a somewhat modified embodiment, be axially oriented grrooves 12a and ridges 13a of an insertion portion 9a. A preferred embodiment according to the invention, however, is one in which these grooves and ridges 12,13 possess a pitch running in a direction opposite to the intended direction of rotation for insertion, preferably with an angle of pitch from about 15 to 87 degrees. They thus have a pitch angle that is greater than a normal screw-thread, but somewhat less than 90 degrees, which would correspond to grooves and ridges 12a, 13a parallel to the anchor post axis, as shown in FIG. 14. A particularly advantageous embodiment illustrated in FIGS. 1, 4–13 has a helical pitch angle A of about 25 degrees of a lefthand helix, on the basis that the anchor post 1 will be driven into the pre-bore 7 by its outer end 2 with a righthand rotation. In consequence, the profiling of the insertion section 11 can be regarded as a kind of multiple screw feedscrew that seeks to transport the mortar mixture or the like present in the profiled insertion part section, upon rotation of the anchor rod in the direction illustrated by the arrow Pf, 1 towards the inner end 14 of the pre-bore (FIG. 7; Pf 3). In the extreme case, a single axial groove 12a can be sufficient for the practice of the invention (compare FIG. 14).

In the region of its inner end 5, the anchor rod 1 is chamfered to provide a frustoconical circumferential shape. As is particularly evident in FIGS. 1, 7 and 10, the grooves 12 extend down into the region of this conical frustum 15 so that their open cross-sections at least partly terminate in edges at the inner end 5 of the anchor post. Accordingly, for example, a packet 16 (FIG. 1) of resin components that is to be broken up to produce the synthetic resin mortar mixture can easily be introduced into the grooves 12. As for the rest, the end surface 17 of the profiled section 11 of the insert part of the anchor runs at right angles to the axis 18 of the anchor rod and is actually a flat surface.

In the region of the inner end 5 of the anchor rod are four somewhat radially disposed kerfs 19. Their free cross-section is more or less triangular and the inclination of each kerf bottom 20 runs in such a way that in the radial direction they approach both the inner end 5 of the anchor post and radially also the longitudinal axis 18. The kerfs 9 thus have a radially symmetrical disposition in a crosscutting manner (compare FIG. 9 and FIG. 10). Especially in connection with the conical frustum 15 and with the disposition of four kerfs, a configuration of the anchor post 1 is obtained that on the one hand is good for breaking up the adhesive packets 16 or other similar mortar containers that are, for example, constituted by glass ampoules, and on the other hand, for the introduction of the mortar mixture or the like into the profiled insertion section and a good and intensive mixing-up of the individual mortar components, additives and so on.

At the same time, as a further feature of the invention, a centering effect of the inner end 5 of the anchor rod 1 on the adhesive packet and on the bottom of the bore hole is to a great extent prevented. An eccentric movement resulting from the deviation of the anchor post axis is produced or favored. This eccentric movement that takes place at least in the region of the inner end 5 of the anchor rod 1 is desired according to the invention for the undercutting type of wearing away of the inner end region 21 of the pre-bore 7, a matter that will be further described in connection with FIGS. 4, 5 and 6. The individual end surface sectors 17a remaining between the kerfs 19 are still symmetrically arranged, so that the eccentric movement of the anchor rod 1, considered in this cross-sectional plane, will not become too irregular. In consequence, a certain gradualness of the cross-section variations of the ring gap present in the inner end region 21 of the pre-bore between the anchor rod 1 and the wall 22 of the widened bore 7a is obtained.

Figure 14:
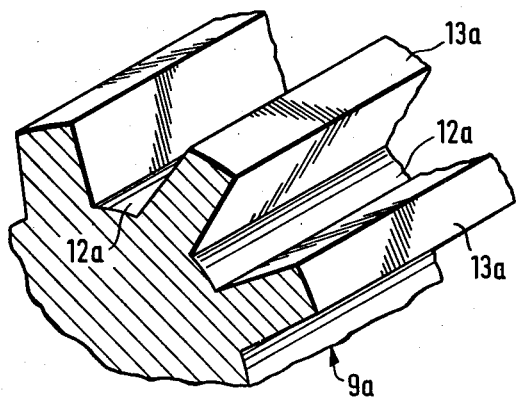
FIG. 14 is a highly diagrammatic and partially perspective view of a part of the insertion end of a somewhat modified anchor rod with axially running grooves and ridges.

The ridges 13 or similar profiled ribs of the profiled insertion part section 11 of the anchor rod 1 have a somewhat trapezoidal cross-section in the illustrated example that preferably has sharp or jutting outer edges 23 (FIGS. 11–13). In a preferred embodiment of the invention, these grooves 12-13 are formed without cutting and instead by cold-deformation, so that beads 23a are produced thereby, at least in certain sections or segments of these outer edges 23 of the ridges 13. The faces 24 of the ridges of the profiling that are directed externally are such that the ridges according to the invention are usually of inverted trough shape.

The features above mentioned have the effect that in a manner to be further described below, the abrasive grains 35 have an increased dwell time in the region of the surfaces 24 of the ridges 13 and accordingly can contribute considerably to the widening of the pre-bore 7.

The ridges 13 of the profiled entrainment section 11 of the anchor rod can also have a different polygonal cross-section, for example a triangular cross-section. They also do not need to run continuously in the axial direction. It is preferred from the point of view of their function and particularly from the ease of manufacture, for this profiling to have the above-described form, particularly that illustrated in FIG. 1 and FIGS. 4–13, in which there are grooves 12 and ridges 13.

As is readily seen in FIG. 7, the profiled entrainment section 11 of the anchor rod extends in its axial length b over half of the axial length of the insertion part 9 of the rod. Between the profiled entrainment section 11 and the intermediate collar 6, the remaining portion of the insertion part 9 has the configuration of a cylindrical shaft section 10 that has a substantially smooth peripheral surface 26. It has been found advantageous that the ratio of the axial length d of the profiled entrainment section 11 to the axial length c of the smooth shaft section 10 to be about 1 to 0.8, more or less. The smooth shaft section is accordingly about the same length or somewhat shorter than the profiled insertion section 11.

As is also visible in FIG. 7, the anchor rod 1 has different diameters D1,D2, etc. in its various longitudinal sections. D1 is the outer diameter of the external end threading 4, e.g. corresponding to a nominal outer diameter of M16 threads. D2 is the diameter of the intermediate collar 6; it is preferably about the same magnitude as D1. The diameter D, referred to the envelope shape of the profiled insertion section 11 increases gradually according to one feature of the invention from the junction of this profiled insertion section 11 with the smooth shaft section up to the region of the inner end 5 of the anchor rod, preferably a continuous monotonic increase. The profiled insertion section 11 in the immediate neighborhood of the smooth shaft section 10 has a diameter D3.1 that is practically the diameter D3 of the smooth shaft 10. In contrast thereto, the greatest outer diameter D4 of the profiled entrainment section 11 that is located in the region of its inner end 5 has a diameter D4 that corresponds at least approximately to the diameter D2 of the intermediate collar 6 or, which is about the same thing, the nominal diameter D1 of the external threading 4. The diameter D5 of the (unwidened) prebore fits the diameter D1, D2 and D4, i.e D5 corresponds in substance to D2, D4, etc. without D5 being smaller than D2, D4, etc. In practice, this is obtained regularly by using a drill of the same diameter D1 as the external threading D4 or the diameter D2 of the intermediate collar 6. Since with such a drill the unobstructed space of the pre-bore 4 in practice comes out a little bit larger, a slight gap 28 remains between the unwidened wall 22 of the pre-bore 7 and the outer contour, for example, of the intermediate collar 6. This gap 28 is indicated in FIG. 7 and lies in the order of magnitude of 0.1 mm.

In the above-described manner, the anchor rod 1 on the one hand still has a good centering support in the fastening matrix 8 in the region of the intermediate collar 6, while on the other hand the result is obtained that an excess of mortar can squeeze out of the pre-bore 7. The inherently required gap width Sp between the pre-bore 7 on the one hand and the anchor post 1, where the mortar should form a layer and harden, is obtained on the one hand by a reproduced diameter D3 of the smooth shaft section 10 compared to the threading diameter D1, the intermediate collar diameter D2, and the diameter D5 of the pre-bore and also by profiled insertion sections having at least in part such a reduced diameter, and on the other hand by the diameter increase in the inner end region 21 of the pre-bore, as well as by the grooves 12. Accordingly, the diameter D3 of the smooth shaft section 10 is so selected according to the invention that there a ring gap Sp of a width of about 1 mm is formed. For example, an anchor rod 1 with an external winding 4 of M16 size or an intermediate collar diameter D2 of 16 mm which corresponds closely thereto, would accordingly have the diameter D3 of about 14 mm for the smooth shaft section 10. The diameter 3.1 of the outer end 29 of the profiled insertion section then also has about 14 mm value in this case. At the place of the greatest diameter, this profiled insertion section 11 then has an outer diameter D4 of about 16 mm. By the choice of such diammetral ratios, the possibility of a "through mounting" (with reference to the surface plate 30, 30a, as shown in FIGS. 2 and 7) is maintained. The profiled insertion section can then be introduced into the pre-bore and, if necessary, the intermediate collar 6 can also serve for centering, partly in the matrix 8 and partly in the plate or other article 30 to be fastened down (FIG. 2). Just as the outer diameter of the profiled insertion section 11 increases towards the inner end of the anchor rod, the height h of the ridges 13, measured between the bottom 31 of the grooves 12 and the radially outward facing surfaces 24 of the ridges 13, increases from the outward end 29 of the profiled insertion section to the inner end 5, preferably continuously. The height h1 and h2, as well as the width b1 of the ridges, then, in the region of the inner end 5 of the profiled insertion section 11, are suited for the dimensions of the abrasive grains or particles (compare FIGS. 8 and 13).

The anchor rod 1 as shown in the drawings also has a superposed keying element 32 located axially above the outer connection port 3. In the illustrated case, this is formed by a screwhead-like hexagonal stud 33. Its envelope cylinder is of a diameter smaller than the inner diameter of the threading of the connection part 3, so that for example a nut 33a can readily be screwed onto the part 3 (FIGS. 1 and 7). The keying element provides for a sure transfer of rotary forces, e.g. from a manually held drill through the anchor rod 1, whenever at times substantial forces must be transferred in the case of an anchor rod 1 that swings or wobbles somewhat. The transitions 34 between the individual anchor rod sections 3,6 and 10 are constituted in each case with an inclination u of less than 15 degrees, so that negative shoulder effects are prevented or at least kept quite small.

The free cross-section of the grooves provided by the heights h2 and h1, as well as the width b1, and the grain size of the abrasive grains 35 are, as mentioned before, to be provided so as to suit each other.

The method of the invention can be practiced with the anchor rod 1 in the following manner. First, the pre-bore 7 of a diameter D5 fitting the anchor rod 1 is drilled. Then, in the conventional way mortar, and preferably as a rule synthetic resin mortar, is introduced into the pre-bore. This can, for example, be performed by means of the packet 16 that holds a two-component synthetic resin mortar in two separate glass ampoules (capsules). The synthetic resin mortar can, however, also be otherwise provided, for example in the form of paste or even a solid. In accordance with the invention, abrasive grains 35 or similar hard additives are introduced as abrasive elements in the pre-bore 7. This can preferably be constituted by quartz sand grains or the like with a grain size range of about 0.3 to 6 mm, preferably about 1.5 to 1.8 mm. The known two-component adhesive packets can also be used which already provide grains for other reasons, namely as fillers or as stabilizing additives. Care must be taken, however, that the grains have sufficient hardness and sharp surface shapes and that a sufficient portion of them lie in the above-mentioned grain size range, so that these additives can cooperate as abrasive elements with the anchor rod shaped in accordance with the invention. With the supporting assistance of the shaping according to the invention of the inner end 5 of the anchor rod 1 (cf. particularly FIGS. 9 and 10, as well as the description relating thereto), when the anchor rod 1 is introduced into the pre-bore 7 in the usual way, the packet 16 is broken up and its content mixed. Usually, this is produced with a manually held power drill that can preferably also operate as a percussion drill (hammer drill). The two superimposed movements then produced, namely the rotary movement and the axial percussion movement are indicated in FIG. 4 by the arrows Pf1 and pF4. In the illustrated example, a power drill operating with righthand rotation, as is conventional, is used, the direction of rotation being indicated with the arrow Pf1, since this direction of rotation is suited to the lefthand pitch of the smooth-ridge profiling 36 of the profiled insertion section 11. Pieces of the packet of the synthetic resin mortar, e.g. the glass ampoules of the packet 16, are then reduced in size by the anchor rod 1 and mixed into the mortar.

FIG. 1 shows the initial condition before the breaking up of the packet 16. FIG. 4 shows a stage of the method in which the packet 16, or its equivalent, is already broken up and at least partly already mixed in. Many abrasive grains 35 are shown that likewise are already distributed relatively uniformly in the mixture 37 of synthetic mortar 38 and abrasive grains 35 (and ultimately comminuted parts of the packet 16). In order that no part of the mixture 37 should be lost in an uncontrolled fashion, the pre-bore 7, except for its mouth 39, is a completely closed dead-end bore (if necessary, this last condition may have to be established by an auxiliary step, such as stopping up one end of a through hole). In the stage of the operation shown in FIG. 4, the pre-bore 7 is still cylindrical. The region of the inner end 5 of the anchor rod with the diameter D4 fits the diameter D5 of the pre-bore. In practice, the introduction of the anchor rod 1 by means of a hand-held power drill or the like results inherently in a certain eccentric movement of the anchor rod, which is indicated in FIG. 5 by the double arrow Pf5. Also with drill equipment in which the advance is guided rigidly by a machine, it is possible to see to it that the anchor rod 1 is not restrained from such a wobble movement which is strongest in the region of the inner end 5. It is favored and desirably supplied intendedly when the sectors 17a of the end face 17 butt into resistance. The latter can be provided for example by the packet 16 and also by the mortar mixture 37. As can readily be seen from FIGS. 5, 8 and 13, the mixture 37 presses into the region of the profiled entrainment section 11 of the anchor rod 1 and the abrasive grains are thereby moved along partly in the grooves 12 by the rotary movement Pf1 and partly may penetrate between the inverted trough outer faces 24 of the ridges 13 on the one hand and the wall 22 of the pre-bore 7. The hard abrasive particles thereby widen the pre-bore 7 in its inner end region 21. On account of the oppositely running pitch of the groove-ridge profiling 36 with respect to the direction of rotation Pf1 there is produced according to the invention the superimposition of a number of movement components of the mixture 37 (see FIG. 7). With the pressing-in of the anchor rod 1 (see FIGS. 4-6), the rod compresses the mixture 37 to a considerable extent causing it to flow in the direction of the opening 39 of the pre-bore (see the broken line arrow Pf6 in FIG. 7). By the rotary movement of the anchor rod 1, in connection with the groove-ridge profiling 36, the mortar mixture 37, however, is propelled in the direction of the inner end 14 of the pre-bore 7, which is to say of the widened pre-bore 7a, as shown by the broken line arrow Pf3 in FIG. 7. At the same time, the mortar mixture 37 participates with the rotary movement already mentioned, as shown by the broken line arrow Pf1 in FIG. 7 and FIG. 13. Accordingly, the mortar mixture 37 does not simply take the easiest way in the direction of the mouth 39 of the bore to exit therefrom because of the compression effect of the advancing anchor rod 1. Instead, a substantial portion of the abrasive grains 35 are held in the inner end region 21 of the pre-bore 7 and even are in part driven back towards the inner end 14 of the bore 7. This portion of the abrasive addition to the mixture takes part in the frictional wear movement affecting the pre-bore and may do so again and again. Advantageously there then results according to the method of the invention a somewhat pear-shaped widening 7a of the inner end region 21 of the pre-bore 7 as can be particularly clearly seen in FIG. 6. The chain-dotted lines 40, which deviate somewhat from the longitudinal axis 41 of the bore, are intended to represent the eccentric movement of the anchor rod 1. The originally cylindrical pre-bore 7 is then undercut in its inner end region into a widened bore 7a, which is shown in FIG. 6 filled with mortar and in FIG. 7 with the mortar not shown for reasons of clarity. The abrasive particles 35 can of course also be introduced separately from the two-component synthetic resin mortar into the pre-bore 7 and this may also be done with these particles enclosed in a separate container. As is particularly clear from FIG. 5, the somewhat reduced shaft diameter D3 relative to the diameters D1 of the external threading 4 and the bore diameter D5, favors the performance of a wobble movement by the anchor rod. The shards of the packet 16 or other packing, worn off wall particles and so on, are mixed into the mortar and abrasive grain mixtures 37 during the advance of the anchor rod 1 into the bore. They contribute to the filling of the ring gap 28 by the mortar mixture 37. Occasionally, individual particularly hard components that may be broken off from the wall of the pre-bore 7, for example, later contribute after the fashion of the abrasive grains.

After the hardening of the synthetic resin mortar 38, a very good bond is formed between the anchor rod 1 and its fastening matrix 8, particularly in the region of the inner end portion 21 of the pre-bore. Along with the chemically produced adhesive forces of the bonding mortar, there is additionally the effect of the groove-ridge profiling 36 in the region of the inner end of the anchor rod 1, and furthermore the undercut type of widening of the bore 7a. When the mortar is fully hardened there is thus, to a considerable extent, an additional keying together of the anchor rod 1, the hardened mortar 38 and the inner end region of the pre-bore. The fact that the bond of the anchor rod 1 to the fastening matrix 8 in this fashion can be made predominant in the inner end region of the bore 7a is partly due, according to the invention, also to the smooth configuration of the surface of the shaft section 10.

It has been found that upon heavier loading of the anchor rod of the invention, a certain expansion movement in the axial direction can be produced, particularly in the region outward from the profiled insertion section, hence particularly in the region of the smooth shaft section 10, without the breaking out in the vicinity of the outer side 42 of the fastening matrix 8, of a fracture cone of the matrix. Indeed, experiments have shown that the anchor rod 1, in accordance with the invention, enters into bonding with the fastening matrix at a substantially greater spacing from the outer wall or surface 42 of the matrix; i.e., that the anchor rod 1 is bonded correspondingly with the matrix 8 practically essentially in the region of the inner region 27 of the widened bore 7a. FIG. 3 shows for comparison with the present invention, an anchor rod St with a continuous threading 4a running from its outer to its inner end. In otherwise comparable conditions, the hardened bonding mortar in the neighborhood of the outer surface 42 of the matrix 8 cannot accommodate a subsequent expansion of the anchor rod in such a way that the bonding effect of the synthetic resin mortar can continue all the way to the neighborhood of the inner end region 21a of the bore B.

The invention also utilizes the above-mentioned findings to provide a special embodiment and the possibility of a special utilization of the anchor rod. Accordingly, a further development of the anchor rod 1 consists in that the smooth shaft section 10 of the insertion portion 9 has a particularly minute surface roughness. As a result, the adhesion of a synthetic resin mortar to the anchor rod is purposely reduced to heighten the above-described effect. Preferably, the surface roughness should be less than 20 $\mu$. In a further development of this embodiment, there is the further provision by the present invention that the smooth shaft section 10 should at least partly be coated with a so-called release coating 43 which favors the separation there of the surface of the anchor rod from the mortar. This prevents in a chemical manner a bonding between the mortar on the one hand and the corresponding portion of the anchor rod. In this way, not only is it possible to assure strong fastening region between the anchor rod 1 and the matrix 8 in the inner end region 21 of the widened bore 7a. It is also possible, if necessary, to utilize the anchor rod 1 as an expansion bolt. It thus has a somewhat axially yielding shaft section 10 to absorb expansion. In FIG. 1, at the righthand side, such a release coating 43 is indicated in a highly diagrammatic manner.

Finally, the invention also comprehends the manufacture of the profiled insertion section 11 and preferably of the entire anchor rod 1 essentially by cold deformation. It is thereby possible in the simplest manner to form the outer edges 23 of the ridges 13 at least intermittently with burrs or beads. The wearing away of the wall 27 of the pre-bore 7 is thereby favored. On the one hand, the outward facing surfaces 24 of the ridges 13 thereby obtain an inverted trough cross-sectional profile, which in the manner already mentioned, keeps the abrasive grains 35 longer in the active region (see also FIG. 13). On the other hand, these somewhat radially projecting outer edges 23 exert a function of squeezing ribs that press the abrasive grains rolling into the region of the surfaces 24 particularly hard against the wall 22 of the pre-bore. The effect of the squeezing ribs can be still further increased, according to a further development of the invention, by hardening. Furthermore, the previously mentioned profiling additionally leads to an intensive biting action between the anchor rod 1 and the hardened mortar mixture 37. In the inner end region 21 of the pre-bore to some extent, a mortar section is solidly spliced onto the anchor rod 1 with its crenellations and profilings, which provides a practically complete keying, both with the fastening matrix 8 and with the anchor rod, so that even under very strong pulling loads on the anchor rod, no shifting of the anchor rod takes place in the end region of the widened bore 7a.

A further feature of the invention consists in that in the setting process for the anchor rod 1 of the invention, the region in which the tension forces are applied stably and to a great extent rigidly, and free of relative shift to the fastening matrix 8, is spaced away from the outer surface 42 of the fastening matrix 8 by a considerable spacing towards the interior of the matrix. Essentially this spacing amounts to the offset provided by the axial length of the smooth shaft section 10 and sometimes also a corresponding portion of the intermediate collar 6. This spacing thus corresponds approximately to the length of the shaft section c shown in FIG. 7, which may occasionally have added to it part or all of the portions b. The invention thus leaves open the possibility that these portions c and b can be made long enough to correspond to the requirements for raising the validity for security of the fastening. Although as the result of the provisions of the invention, the advantage of a substantially greater load-carrying ability of the anchor rod 1 is obtained, the difficulty and expense of the setting place of the anchor rod 1 is practically no greater than in the case of previously known anchor rods. An economical production of the anchor rod 1 is possible if the anchor rod 1 is produced according to the method of manufacture provided by the invention.

Further advantages are, among others: by forming procedures involving no cutting, particularly cold deformation, for the entrainment section 11 of the anchor rod there is also obtained a stiffening of the anchor rod material in this region that is advantageous for the widening of the pre-bore. As can easily be seen by comparison of FIG. 2 and FIG. 3, for the same threading diameter D1, D1', the diameter D5 of the pre-bore can be kept somewhat smaller. The gap width Sp necessary for the mortaring, nevertheless is preserved, on the one hand because of the somewhat reduced diameter D3, the three of the shaft portions 10, on the other hand because of the widening 7a of the pre-bore 7 that is obtained. Within certain limits, it is also possible to fit the gap width to the practical requirements. This can be done in part by corresponding choice of the shaft section 10 to a certain extent and also by the extent of the widening 7a of the pre-bore 7. In this connection, the following should also be noted. Eccentricity of the movement of the entrainment region 11 of the anchor rod 1 is also subject to some influence by the applied insertion force pressing the rod in. The more strongly that the rod is loaded in the direction of advance during insertion (see arrow Pf4 in FIG. 4), the stronger the end of the anchor rod 1 tends to enter into eccentric movement. As already mentioned, if necessary, widening of the bore can also be somewhat influenced by the choice of particularly effective abrasive grains 35.

It is also possible to introduce additional abrasive forces independently of the mortar to produce an initial abrasion task. Such abrasive additions can also take over a double function: after the widening of the bore 7a, these abrasive additions can serve to improve the shear and pressure resistance of the mortar.

The invention is not limited to synthetic resin mortars. It is also possible to utilize other mortar materials, for example cement mortar, in an analogous manner.

In the case of synthetic resin mortar and smooth constitution of the shaft section 10, however, the following advantage is obtained. If the anchor rod 1, as the result of tension stress, is subjected to its axial expansion, the mortar in the region of the smooth shaft section is not stressed or at least not to the extent heretofore usual. In consequence, the danger of formation of cracks in the mortar is reduced or entirely prevented. If necessary, a release coating 43 can contribute to this result.

As can be seen from FIGS. 1, 2 and 4–6, the anchor rod 1 begins to carry out an appreciable eccentric movement only when it reaches the inner region of the bore. Also, the abrasive particles 35 are agitated correspondingly intensively and over a sufficiently long period essentially only in the region of the entrainment section 11 of the rod. Thus, the widening of the bore also occurs more strongly in the region 21 (FIG. 6).

Figure 15:
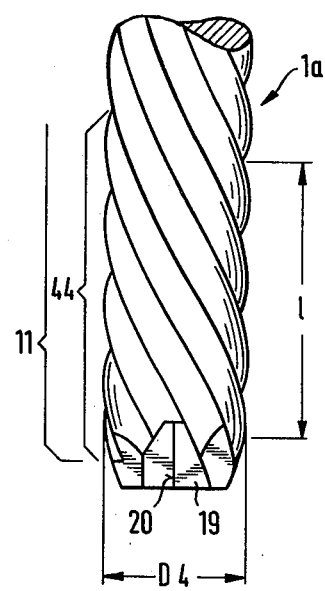
FIG. 15 is a side view of the bottom portion of a somewhat modified embodiment of anchor rod.

Finally, FIG. 15 shows still another somewhat modified embodiment 1a of the anchor rod. In contrast to the anchor rod 1, according to FIG. 1, the entrainment portion 11 at its inner end is provided over an axial length 1, not with a conical, but rather with a cylindrical envelope shape. This has the advantage that in the region 21 in which most of the widening work must be performed on the bore 7, the anchor rod 1a is made correspondingly strong and powerful. Certain abrasive effects on the anchor rod 1 that may take place thereby are reduced for the form of rod provided in the rod 1a.

Although a large number of features of the invention have been described above, it is to be understood that it is not necessary for all of them to be used in combination and that they made be used in any of the possible combinations of two or more of them and to some advantage even individually. It is also evident that other modifications and variations are possible within the inventive concept.

We claim:

1. An anchor rod for setting in and fastening, with the use of a hardenable mortar, to concrete and similar structural matrices into which a prebore which closely fits the portions of greatest diameter of said anchor rod has been prepared, said anchor having first and second extremities and comprising:
   a connection portion at or near the first extremity of the rod designed to remain outside of the prebore and to provide for fastening an object to said rod or to said concrete or structural matrix;
   an insertion portion provided, in a region thereof extending substantially to the second extremity (5) of the rod, with profiling for causing mortar and abrasive grains mixed therewith to be carried along by rotation of said anchor rod during insertion thereof, said profiling being provided in the form of a multiplicity of outwardly extending uniformly spaced ridges running in an axially directed steep-pitch spiral configuration providing grooves (12) between adjacent ridges, said ridges each having a slight trough-like concavity (24) running between a pair of outwardly directed apices (23).

2. An anchor rod as defined in claim 1 in which said insertion portion includes a smooth shaft section (10) and said profiled entrainment section (11) of said anchor rod smoothly adjoins said substantially smooth shaft section (10), said smooth shaft section having a diameter smaller than that of any other portion of the insertion portion of said anchor rod.

3. An anchor rod as defined in claim 1 in which said ridges (13) and grooves (12) are open at said second extremity of the rod, and in which the pitch of said spiral configuration has an angle of rise of from 15 to 87 degrees.

4. An anchor rod as defined in claim 3 in which said pitch angle is about 25 degrees.

5. An anchor rod as defined in claim 3 in which the twist of said spiral configuration of said grooves (12) and ridges (13) is in the sense of a left-hand screw thread, for facilitation of insertion of the rod with rotation in a direction in which the twist of said spiral configuration opposes the insertion and rotation movement.

6. An anchor rod as defined in claim 1 in which said profiling (11) extends over from one-half to two-thirds of the entire length of the insertion portion (9) of said anchor rod, while the remainder of said insertion portion is a cylindrical shaft section (10).

7. An anchor rod as defined in claim 2 in which an intermediate collar (6) is provided at the end of said connection portion of the rod towards the middle of the rod, said intermediate collar being substantially cylindrical and being interposed between said connection portion (4) and said smooth shaft section (10) of the insertion portion (9) of the rod.

8. An anchor rod as defined in claim 2 in which said profiling (11) thereof has a peripheral diameter (D3.1 to D4) that has its greatest value (D4) near said second extremity (5) of said rod and diminishes therefrom towards the other end of said profiling where the peripheral diameter of the profiling corresponds with the diameter of the adjoining smooth shaft section (10).

9. An anchor rod as defined in claim 1, in which said second extremity of the rod has at least approximately a frusto-conical enveloping shape.

10. An anchor rod as defined in claim 8 in which the maximum peripheral diameter of said profiling (11) of the rod is located near its termination at said second extremity of the rod and is equal to or slightly smaller than the diameter (D2) of said intermediate collar, and in which, further, the height (h) of the ridges (13) of said profiling increases gradually from the region of said profiling nearer said collar towards said second extremity (5) of the rod.

11. An anchor rod as defined in claim 2 in which said smooth shaft section (10) has a surface roughness less than 20 $\mu$m.

12. An anchor rod as defined in claim 11 which said smooth shaft section (10) is at least partly coated with a release-promoting layer (43).

13. An anchor rod as defined in claim 1 in which the end face (17) of said insertion portion (9) of said anchor rod is oriented substantially transverse to the longitudinal axis (18) of said rod.

14. An anchor rod as defined in claim 13 in which said end surface (17) is flat.

15. An anchor rod as defined in claim 9 in which at least some of said grooves (12) extend into said frusto-conical end portion of the rod.

16. An anchor rod as defined in claim 13 in which a plurality of kerfs (19) are provided on said second extremity (5) of said rod having substantially triangular cross-sectional profile, the kerf bottom (20) of each kerf having an inclination towards both the longitudinal axis (18) and the inner end (5) of the anchor rod.

17. An anchor rod as defined in claim 16 in which said kerfs form a symmetrical group of substantially cross-cutting configuration.

18. An anchor rod as defined in claim 1 in which the connection portion thereof is provided with screw threading which does not extend all the way to the end of the rod and in which the end of the rod beyond said screw threading includes a transition beveled portion (34) leading to a coupling element provided at the end of the rod for coupling rotary motion, said beveled portion and the surface enveloping said coupling element having a diameter which is less than the smallest diameter of the screw threading.

19. An anchor rod as defined in claim 18 in which the transitions between individual sections of the anchor rod have an inclination to the axis of the rod that is less than 15 degrees.

20. An anchor rod as defined in claim 1 in which the average width (b2) of said grooves (12) of said profiling (11) is in the range from 2 to 3 mm.

21. An anchor rod as defined in any one of claims 10-14 and 17-20, in which at least the said profiling (11) is produced substantially by cold deformation of the metal from which the anchor rod is made.

22. An anchor rod as defined in claim 21 in which the entire rod is made by cold deformation.

23. An anchor rod as defined in claim 22 in which screw threads are provided on the connection portion (4) thereof by cold rolling and in which an intermediate collar between the connection portion and the insertion section of the rod, of which collar the diameter is the maximum diameter of the rod, is formed by upsetting.

* * * * *